(12) United States Patent
Fodor et al.

(10) Patent No.: US 7,998,026 B2
(45) Date of Patent: Aug. 16, 2011

(54) VEHICLE LAUNCH USING A TRANSMISSION INPUT CLUTCH

(75) Inventors: Michael G. Fodor, Dearborn, MI (US); Davor D. Hrovat, Ann Arbor, MI (US); Hong Jiang, Canton, MI (US); Ian Oldknow, St Albans (GB); Jahan Asgari, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 882 days.

(21) Appl. No.: 12/015,920

(22) Filed: Jan. 17, 2008

(65) Prior Publication Data

US 2009/0186743 A1    Jul. 23, 2009

(51) Int. Cl.
*B60W 10/02* (2006.01)
*B60W 10/06* (2006.01)

(52) U.S. Cl. .......................................... 477/175; 701/67
(58) Field of Classification Search .................. 477/175; 701/67

See application file for complete search history.

(56) References Cited

U.S. PATENT DOCUMENTS

| | | | |
|---|---|---|---|
| 5,074,166 A | 12/1991 | Yamashita et al. | |
| 6,176,808 B1 | 1/2001 | Brown et al. | |
| 6,217,479 B1 | 4/2001 | Brown et al. | |
| 6,299,565 B1 | 10/2001 | Jain et al. | |
| 6,364,811 B1 | 4/2002 | Hubbard et al. | |
| 6,752,743 B2 | 6/2004 | Eich et al. | |
| 6,790,159 B1 | 9/2004 | Buchanan et al. | |
| 6,974,402 B2 | 12/2005 | Colvin et al. | |
| 6,991,585 B2 | 1/2006 | Colvin et al. | |
| 7,044,888 B2 | 5/2006 | Lee et al. | |
| 7,702,445 B2 * | 4/2010 | Gianoglio et al. | 701/67 |
| 2006/0293148 A1 * | 12/2006 | Smith et al. | 477/175 |

* cited by examiner

*Primary Examiner* — Sherry Estremsky
(74) *Attorney, Agent, or Firm* — David B. Kelley; MacMillan, Sobanski & Todd, LLC

(57) ABSTRACT

A method for controlling a transmission input clutch during a vehicle launch includes selecting a subject device that transmits torque between an input and an output, a providing a mathematical model of the subject device, such that the model employing only static relationships of engine speed and transmission input speed to a desired magnitude of torque produced by the subject device, using the model, the current engine speed and the current engine speed to determine the desired torque produced by the subject device, and adjusting the torque capacity of the clutch to the desired torque of the subject device determined from the model.

12 Claims, 4 Drawing Sheets

US 7,998,026 B2

VEHICLE LAUNCH USING A TRANSMISSION INPUT CLUTCH

BACKGROUND OF THE INVENTION

1. Field of the Invention

This invention relates generally to a vehicle powertrain having an input clutch. More particularly, the invention pertains to a method for controlling the clutch during a vehicle launch condition.

2. Description of the Prior Art

A vehicle launch is a low-speed drive-away event in which a vehicle with a transmission is accelerated in response to the vehicle operator depressing an accelerator pedal. When the vehicle powertrain is equipped with a conventional automatic transmission, launch behavior is largely regulated by the torque converter, which ultimately sets engine speed and wheel torque as a dynamic function of engine torque. In this conventional powertrain setting, the torque converter characteristics are first engineered to trade off fuel economy and driving performance, then engine pedal maps (the engine control software relationship between accelerator pedal position and engine torque) are tuned to provide the best vehicle feel for the given converter design.

An emerging trend in automatic transmission design eliminates the torque converter and replaces it with an automatically controlled clutch. Such transmissions provide a lower number of parts, simplicity and robust design, and much commonality with manual transmissions, potentially facilitating production.

This change enables the use of algorithms that can control the clutch in ways more complex than the passive torque converter, eliminating or reducing some of the design tradeoffs inherent in the passive torque converter system. For example, the clutch can be fully opened when the driver presses the brake pedal, eliminating transmission drag on the idling engine, thereby improving fuel economy.

In the automatic clutch setting, the intent of the launch function is to provide a wheel torque that reflects driver demand from the accelerator pedal and provides an engine speed trajectory that meets the competing requirements of providing a "power-on" feel and sound to the driver while limiting clutch component wear associated with slip across the device.

A need exists in the industry for control of the input clutch such that robust, optimized performance is obtained.

SUMMARY OF THE INVENTION

The control method applies to a vehicle powertrain that includes an engine, a transmission and a clutch that transmits torque between the engine and a transmission input. The method for controlling the transmission input clutch during a vehicle launch includes selecting a subject device that transmits torque between an input and an output, providing a mathematical model of the subject device, such that the model employs only static relationships of engine speed and transmission input speed to a desired magnitude of torque produced by the subject device, using the model to determine the desired torque produced by the subject device, and adjusting the torque capacity of the clutch to the desired torque of the subject device determined from the model. The selected device may be a viscous damper or a fluid coupler.

The control produces vehicle behavior that is expected by drivers accustomed to a conventional automatic transmission, and provides a system tuning method similar to that used in a conventional transmission, allowing carryover of former engineering techniques and experience.

The control simplifies the design by eliminating the need for multiple tuned control loops with associated feedback measurement targets and the inherent difficulties of aligning those targets with engine torque.

The control method is insensitive to engine torque hesitation, engine torque errors with respect to driver demand, and clutch torque errors as compared to other control approaches.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

To provide a vehicle launch behavior that is consistent with conventional transmissions, the clutch is controlled during the launch event such that it emulates the behavior of a passive transmission input device, such as a torque converter.

Figure 1:
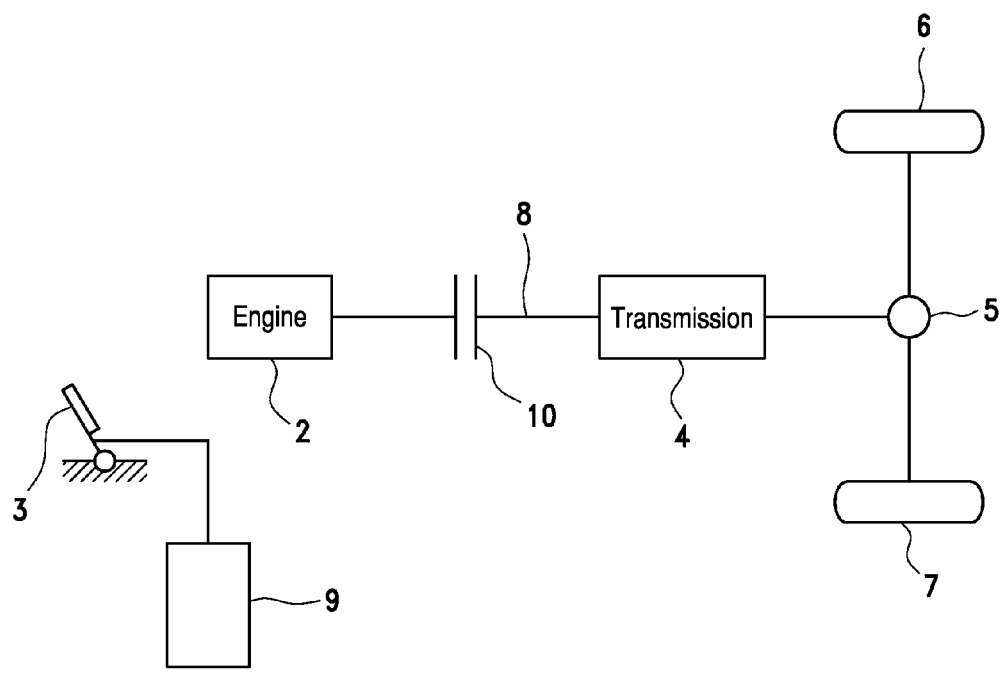
FIG. 1 is a schematic diagram showing a vehicle powertrain that uses a clutch to launch the vehicle.

Referring now to the drawings, there is illustrated in FIG. 1 a vehicle powertrain that includes an engine 2, transmission 4, and differential mechanism 5 for transmitting transmission output torque differentially to the vehicle wheels 6 and 7. A friction clutch 10 having a variable capacity to transmit torque, driveably connects engine 2 and a transmission input 8 when clutch 10 is fully engaged or closed, disconnects the engine and input 8 when the clutch is fully disengaged or open, and partially connects the engine and input 8 when the clutch is slipping. Clutch slip is the difference between engine speed 11 and transmission input speed 12.

Figure 4:
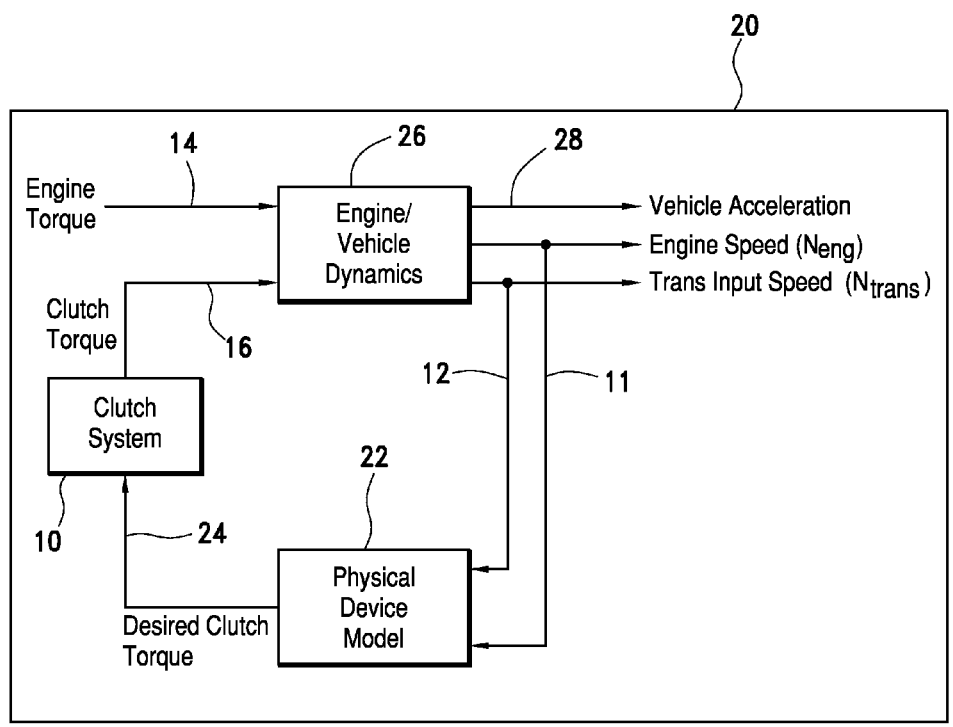
FIG. 4 is schematic block diagram of a control for emulating torque transmitting capacity of a transmission input device used in launch control of the vehicle.
Figure 5:
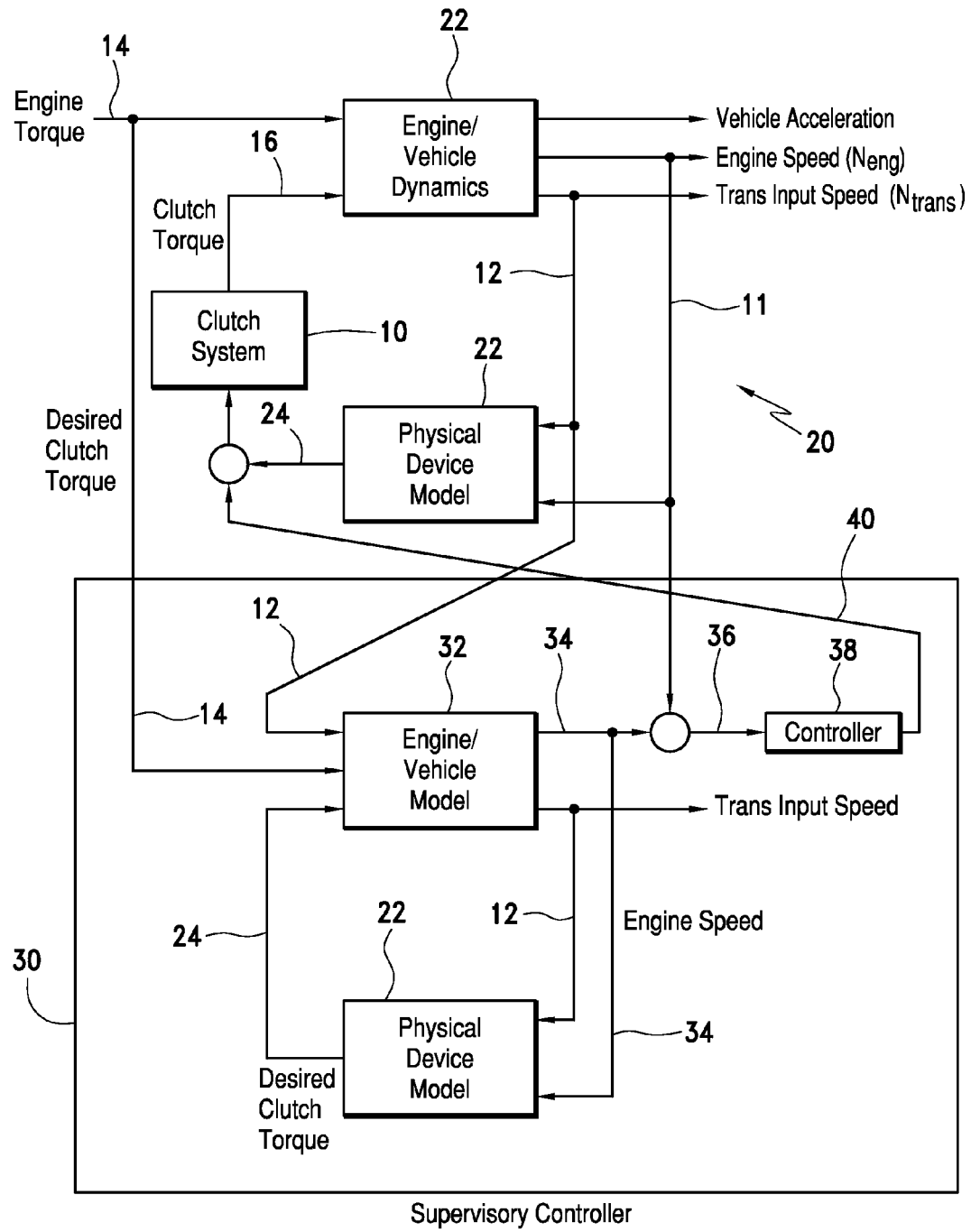
FIG. 5 is schematic block diagram of a supervisory control use in launch control of the vehicle.

The control system of FIGS. 4 and 5 receive as input a signal representing the current engine torque 14. The engine torque signal is produced from an engine torque map 9 in response to the extent to which an accelerator pedal 11 is displaced.

Figure 2:
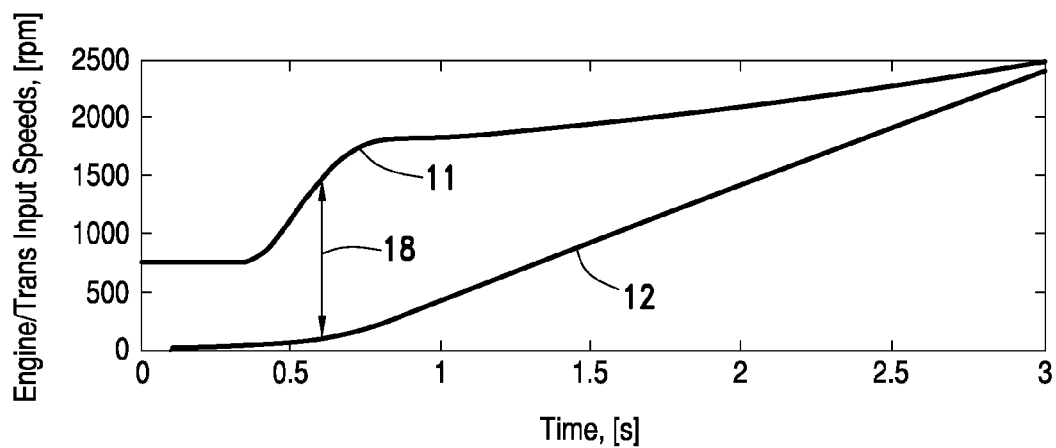
FIG. 2 is a graph showing the variation of engine speed and transmission input speed during a vehicle launch.
Figure 3:
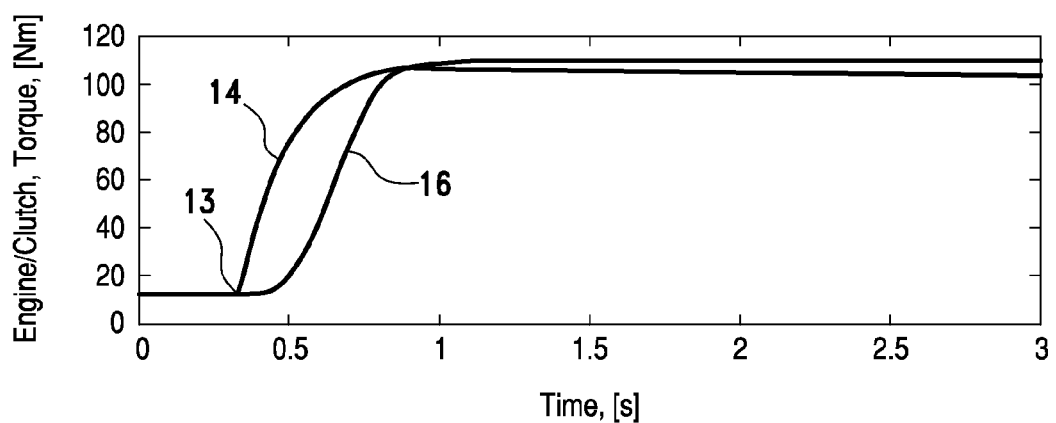
FIG. 3 is a graph showing the variation of engine torque and transmission input torque during a vehicle launch.

FIG. 2 shows the variation of engine speed 11 and transmission input speed 12 during a typical launch event. FIG. 3 shows the variation of engine torque 14 and transmission input shaft torque 16 during the launch event.

After the driver depresses the accelerator pedal 3, at 13, engine torque 14 increases with a resulting increase in engine speed 11. As slip 18 across the clutch 10 increases, the torque transmitting capacity of the clutch 10 increases in response, bringing the engine speed 11 into a quasi-equilibrium state and providing propulsion torque to the wheels 6, 7. Ultimately the engine speed 11 converges sufficiently close to the input shaft speed 12 that the launch event is considered complete, and the transmission and clutch controls enter a new state of operation.

FIG. 4 illustrates a block diagram of a system 20 for controlling clutch 10, in which software for controlling the clutch contains a mathematical model 22 of a physical device, such as a torque converter, fluid coupler, or centrifugal clutch. Model 22 emulates performance of the modeled device's torque response and uses clutch 10 as a slave actuator.

Engine speed 11 and transmission input speed 12 are measured and supplied as input to the physical device model 22, which produces a clutch torque command 24. A servo for actuating clutch 10 responds to command 24 by producing the clutch torque capacity corresponding to command 24.

The system operates closed-loop and can be analyzed using conventional closed-loop system design methods. However, the controller 20 in this form is not a tracking controller, i.e., it does not attempt to track a target engine speed or target wheel torque. Instead, wheel torque response and engine speed trajectory during the vehicle launch are tuned by adjusting the characteristics of the model 22 of the passive device and adjusting the software that controls engine torque 14 in response to driver inputs and the vehicle state.

Two possible physical device models 22 are detailed in Equations (1) and (2). Equation (1) models a viscous damper whose desired torque is simply proportional to the slip 8 across clutch 10:

$$\tau_{desired} = k(N_{eng} - N_{trans}) \tag{1}$$

Here, $\tau_{desired}$ is the desired clutch torque, $N_{eng}$ is engine speed 11, $N_{trans}$ is transmission input shaft speed 12, and k is an adjustable proportionality constant.

Equation (2) models a fluid coupler that behaves like a torque converter operating above its coupling point:

$$\tau_{desired} = \frac{N_{eng}^2}{R^2}, \quad R = \Im(N_{eng}/N_{trans}) \tag{2}$$

Here, R is the capacity factor, a function of the ratio of engine speed 11 and transmission input shaft speed 12. This function, R the capacity factor, can be determined from a polynomial, a table, or other means indexed by $N_{eng}$ and $N_{trans}$.

Launch performance can be improved in some vehicle systems if different physical device models are chosen according to the accelerator pedal position. This can be accomplished in the Equation 1 and 2 settings by adjusting proportionality constant k (Equation 1) or capacity factor R (Equation 2) as a function of pedal position.

It is important to note that some physical devices cannot be fully modeled by this method, because a clutch produces the same torque (with opposing direction) on both its input and output shafts, but a device such as a torque converter can provide torque multiplication from its input to its output.

The engine dynamic characteristics and vehicle dynamic characteristics 26, such as mass and inertia, road conditions including road grade and friction, and operating conditions including altitude, determine the engine speed 10 and vehicle acceleration rate 28 during the launch. Model 22 includes checks to ensure that if the depressed position of accelerator pedal 11 is decreasing, the desired clutch torque 16 is not increasing.

A major benefit of this method of clutch control is that clutch torque 16 is responsive to engine speed 11 rather than being responsive to an engine speed error with respect to an engine speed target. This means that clutch 10, like a torque converter or coupler, will not start to produce torque until the engine speed 11 responds to an engine torque increase 14. Therefore, the clutch 10 is not prone to stalling the engine should the engine hesitate during cold operation or when operating on degraded fuel. Similarly, with a properly designed device model 22, clutch torque 16 will find equilibrium with the engine torque 14 regardless of any torque error associated with the engine controls. For instance, engine torque capacity is significantly degraded at high altitude. If the engine controls do not properly account for altitude variation, the clutch torque response and vehicle launch behavior will remain well controlled, because they do not depend on engine torque estimation.

While this method is robust to engine torque errors, clutch torque errors, such as when the clutch system 10 produces the wrong torque as compared to the requested clutch torque, can lead to excessive clutch slip 18. For instance, if clutch 10 produces only one-half of the requested clutch torque 16, the slip 18 across clutch 10 must increase sufficiently to double the clutch torque request so that the actual clutch torque 16 properly balances engine torque 14. This increase in clutch slip 18 can lead to unwanted clutch wear.

To address this concern, a supervisory controller 30 can be constructed as shown in FIG. 5. Here, a model of the engine/vehicle dynamics 32 is run in parallel with control system 20. The engine/vehicle dynamics model 32 predicts the response of an idealized launch event using an estimate of engine torque 14 and actual transmission input shaft speed 12 as its inputs. The resulting modeled engine speed 34 is then compared to the actual measured engine speed 11, and the difference 36 is used by a controller 38 to determine a correction 40 to the desired clutch system torque request 24 using a control law.

A typical control law would employ an integral of the error 36, tuned to provide correction of the clutch system torque 16 gently enough to avoid unwanted torque disturbances at the vehicle wheels. Note that the physical device model 22 used in the launch control system 20 is reproduced in the system model inside the supervisory controller 32. Also, using the measured transmission input shaft speed 12 as another input to the supervisory vehicle model 30 insures that the modeled vehicle dynamics are unaffected by changes in road grade or vehicle mass, or a combination of grade and mass.

In accordance with the provisions of the patent statutes, the preferred embodiment has been described. However, it should be noted that the alternate embodiments can be practiced otherwise than as specifically illustrated and described.

The invention claimed is:

1. A method for controlling a clutch that transmits torque between an engine and transmission, comprising:
    (a) using a model of the clutch that includes static relationships of engine speed and transmission input speed to a desired clutch torque;
    (b) determining the desired clutch torque from the model using current engine speed and current transmission input speed;
    (c) adjusting the torque capacity of the clutch to said desired clutch torque.

2. The method of claim 1 wherein the method further comprises the step of:
    preventing an increase in the torque capacity of the clutch, if an accelerator pedal position is decreasing.

3. The method of claim 1 wherein step (a) further comprises:

including in the model the relation $T_{desired}=k(N_{eng}-N_{trans})$ wherein $T_{desired}$ is the desired torque produced by the subject device, $N_{eng}$ is engine speed, $N_{trans}$ is transmission input shaft speed, and k is an adjustable proportionality constant.

4. The method of claim 1 wherein step (a) further comprises:
including in the model the relations $T_{desired}=[N_{eng}/R]^2$ and $R=fn[N_{eng}/N_{trans}]$ wherein $T_{desired}$ is the desired clutch torque, $N_{eng}$ is engine speed, $N_{trans}$ is transmission input shaft speed, and R is a capacity factor of a device represented by the model.

5. The method of claim 1 further comprising the steps of:
providing a supervisory controller that includes a second model for producing an ideal engine speed;
determining an engine speed error by comparing the ideal engine speed and the actual engine speed;
using the engine speed error to correct the desired clutch torque produced by the first model toward an ideal clutch torque produced by the supervisory controller.

6. The method of claim 1 wherein step (a) further comprises:
providing the model such that the model produces a desired clutch torque and is unresponsive to an engine speed error with respect to an engine speed target.

7. A method for controlling a clutch that transmits torque between an engine and transmission during a vehicle launch, comprising:
(a) using a model of the clutch that includes static relationships of engine speed and transmission input speed to determine a desired clutch torque;
(b) using an ideal clutch torque for said launch produced by a second model to correct the desired clutch torque;
(c) adjusting the torque capacity of the clutch to the corrected desired clutch torque.

8. The method of claim 7 wherein the method further comprises the step of:
preventing an increase in the torque capacity of the clutch, if an accelerator pedal position is decreasing.

9. The method of claim 7 wherein step (a)) further comprises:
including in the model the relation $T_{desired}=k(N_{eng}-N_{trans})$ wherein $T_{desired}$ is the desired torque produced by the subject device, $N_{eng}$ is engine speed, $N_{trans}$ is transmission input shaft speed, and k is an adjustable proportionality constant.

10. The method of claim 7 wherein step (a) further comprises:
including in the model the relations $T_{desired}=[N_{eng}/R]^2$ and $R=fn[N_{eng}/N_{trans}]$ wherein $T_{desired}$ is the desired torque produced by the subject device, $N_{eng}$ is engine speed, $N_{trans}$ is transmission input shaft speed, and R is a capacity factor of the selected device.

11. The method of claim 7 wherein step (b) further comprises the steps of:
providing a supervisory controller that includes the second model and produces an ideal engine speed for said launch,
determining an engine speed error by comparing the ideal engine speed and the actual engine speed; and
using said controller and the engine speed error to determine the ideal clutch torque for said launch.

12. The method of claim 7 wherein step (a) further comprises:
providing the model such that the model produces a desired clutch torque and is unresponsive to an engine speed error with respect to an engine speed target.

* * * * *